(12) United States Patent
Sakamoto

(10) Patent No.: US 6,285,507 B1
(45) Date of Patent: Sep. 4, 2001

(54) COLOR IMAGE READING LENS SYSTEM

(75) Inventor: Keijiro Sakamoto, Okazaki (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/404,077

(22) Filed: Sep. 23, 1999

(30) Foreign Application Priority Data

Sep. 29, 1998 (JP) .................................................. 10-274659

(51) Int. Cl.[7] .................................................. G02B 3/00
(52) U.S. Cl. .......................... 359/642; 359/754; 359/757
(58) Field of Search .................................. 359/642, 754, 359/756, 757, 763, 771, 784, 793

(56) References Cited

U.S. PATENT DOCUMENTS

| | | | |
|---|---|---|---|
| 4,435,041 | * 3/1984 | Torok et al. | 350/162.24 |
| 5,187,358 | 2/1993 | Setani | 250/208.1 |
| 6,016,229 | * 1/2000 | Suzuki | 359/784 |
| 6,040,943 | * 3/2000 | Schaub | 359/565 |
| 6,122,104 | * 9/2000 | Nakai | 359/576 |

FOREIGN PATENT DOCUMENTS

| | | |
|---|---|---|
| 4-73711 | 3/1992 | (JP) . |
| 7-121047 | 12/1995 | (JP) . |

* cited by examiner

Primary Examiner—Georgia Epps
Assistant Examiner—Tim Thompson
(74) Attorney, Agent, or Firm—Sidley Austin Brown & Wood

(57) ABSTRACT

An optical system for focusing an original image on an image sensor has an optical element disposed at the image-sensor-side end thereof. The optical element has a positive optical power as a whole, and at least one surface of the optical element has a positive optical power of diffraction.

13 Claims, 8 Drawing Sheets

F4.4

-0.2 -0.1 0.0 0.1 0.2

OBJ HT
M S 150.00

-0.2 -0.1 0.0 0.1 0.2

OBJ HT
150.00

-0.10 -0.05 0.0 0.05 0.10
(%)

F5.2

-0.2 -0.1 0.0 0.1 0.2

OBJ HT
M S 150.00

-0.2 -0.1 0.0 0.1 0.2

OBJ HT
150.00

-0.10 -0.05 0.0 0.05 0.10
(%)

COLOR IMAGE READING LENS SYSTEM

CROSS-REFERENCE TO RELATED APPLICATION

This application is based on application No. H10-274659 filed in Japan on Sep. 29, 1998, the entire content of which is hereby incorporated by reference.

FIELD OF THE INVENTION

The present invention relates to a color image reading lens system (hereafter also referred to simply as "a lens system"), and, in one aspect, to a color image reading lens system, such as that which produces a reduced image of an original image, that is suitable for use in a color image reading apparatus, such as a digital copier, an image scanner, or an image reader.

BACKGROUND OF THE INVENTION

Conventionally-known color image reading apparatuses are mostly of the type that reads an original image by forming a reduced image thereof on an image sensor (for example, a Charge-Coupled Device (CCD)) through a focusing lens system. Such a color image reading apparatus typically employs a color image reading lens system composed of five or six lens elements that offers magnifications ranging from −¼× to −⅒×. Moreover, color image reading apparatuses proposed in Japanese Published Patent Application No. H7-121047, Japanese Laid-open Patent Application No. H4-73711, and others are designed to perform color separation by means of a diffraction grating. Some commercially-available digital copiers are provided with a color-separating image reading optical system composed of seven lens elements and a reflection-type diffraction grating.

However, in the conventional color image reading apparatuses described above, a diffraction grating is employed merely as a color-separating element, and no arrangement has ever been known that takes advantage of the light-diffracting ability of a diffraction grating to correct aberrations.

SUMMARY OF THE INVENTION

An object of the present invention is to provide a compact high-performance color image reading lens system in which chromatic and other aberrations are corrected properly by the light-diffracting ability of a diffraction grating.

To achieve the above object, according to one aspect of the present invention, an optical system for focusing an original image on an image sensor is provided with an optical element that is disposed at the image-sensor-side end of the optical system and which has a positive optical power as a whole, wherein at least one surface of the optical element has a positive optical power of diffraction.

According to another aspect of the present invention, an optical system for focusing an original image on an image sensor is provided with a first optical element and a second optical element. The first optical element is disposed at the image-sensor-side end of the optical system and has a positive optical power as a whole, wherein at least one surface of the first optical element has a positive optical power of diffraction. The second optical element is disposed on the original-image side of the first optical element and has a positive optical power as a whole, wherein at least one surface of the second optical element has a positive optical power of diffraction.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
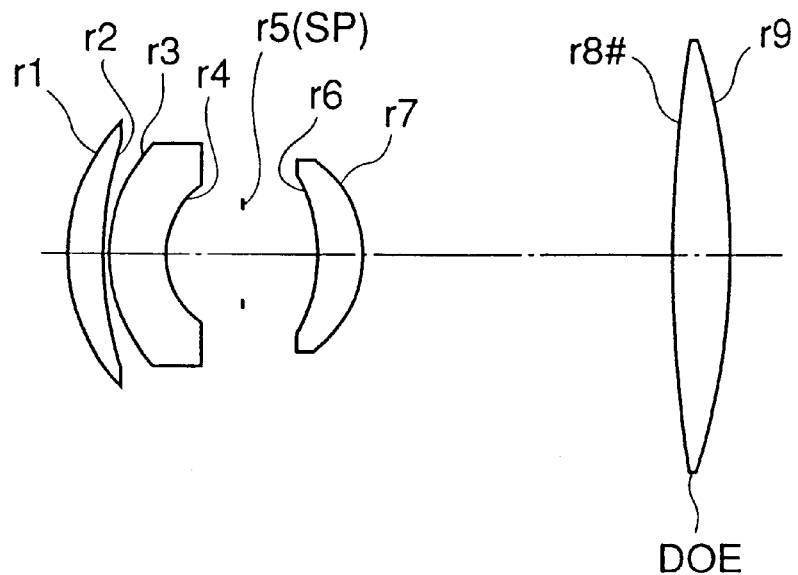
FIG. 1 is a lens arrangement diagram of the lens system of a first embodiment (Example 1) of the present invention.
Figure 2:
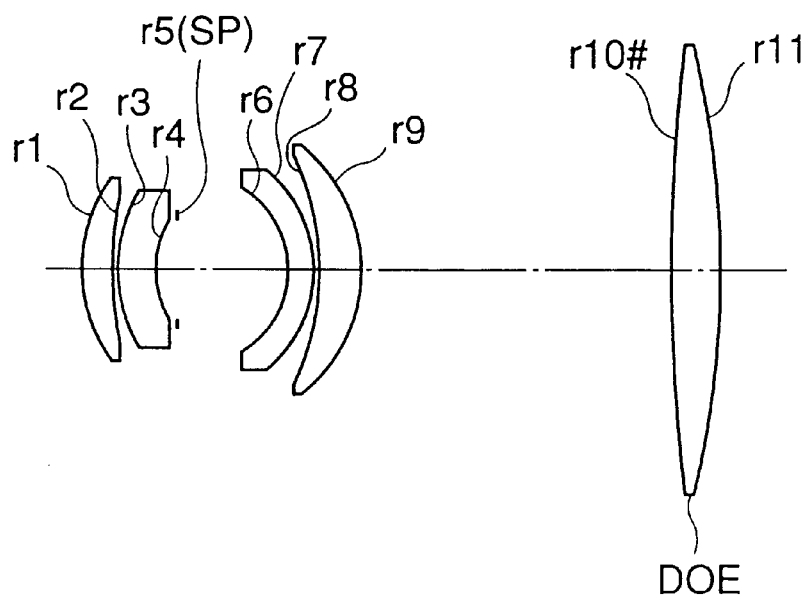
FIG. 2 is a lens arrangement diagram of the lens system of a second embodiment (Example 2) of the present invention.
Figure 3:
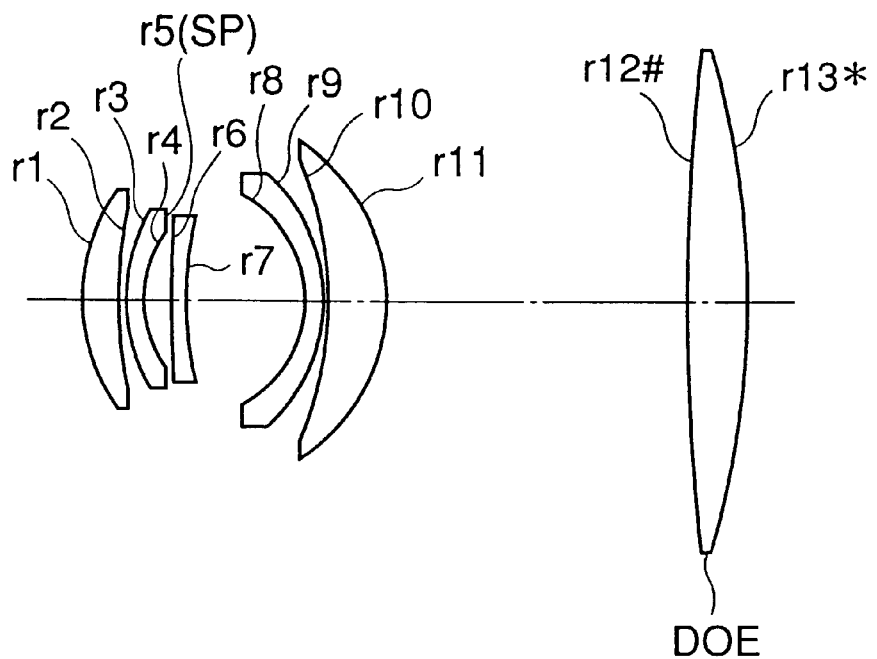
FIG. 3 is a lens arrangement diagram of the lens system of a third embodiment (Example 3) of the present invention.
Figure 4:
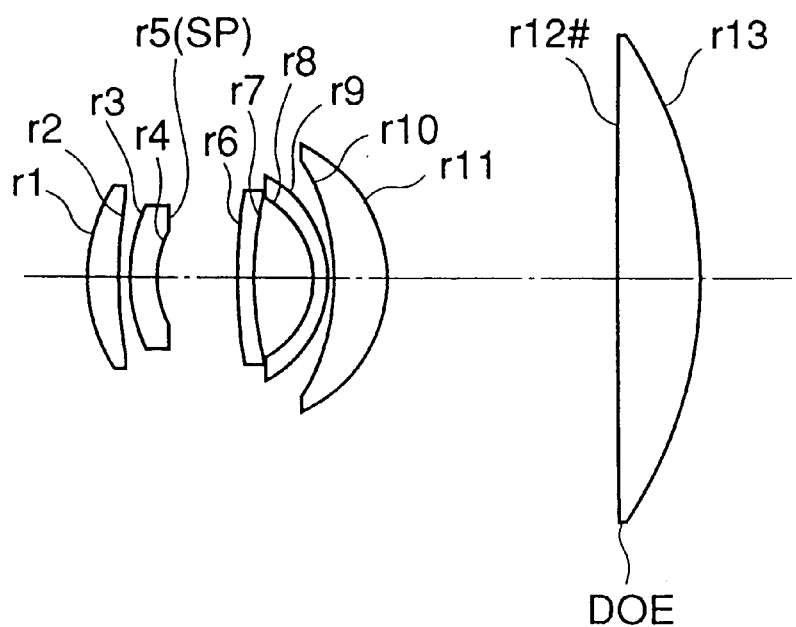
FIG. 4 is a lens arrangement diagram of the lens system of a fourth embodiment (Example 4) of the present invention.
Figure 5:
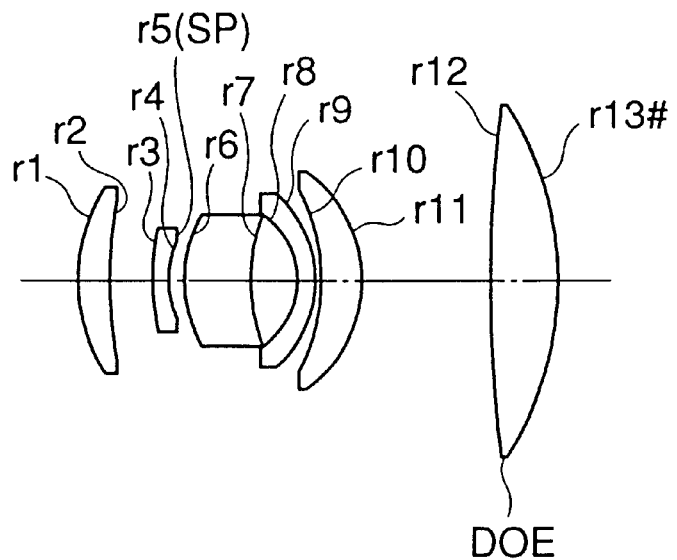
FIG. 5 is a lens arrangement diagram of the lens system of a fifth embodiment (Example 5) of the present invention.
Figure 6:
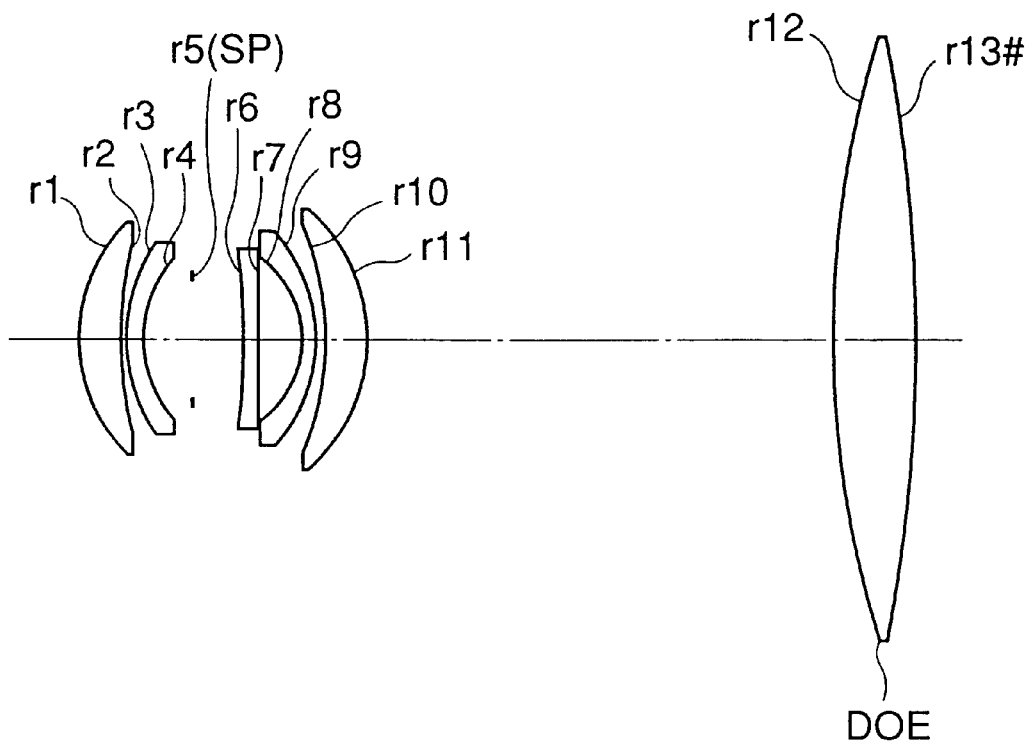
FIG. 6 is a lens arrangement diagram of the lens system of a sixth embodiment (Example 6) of the present invention.
Figure 7:
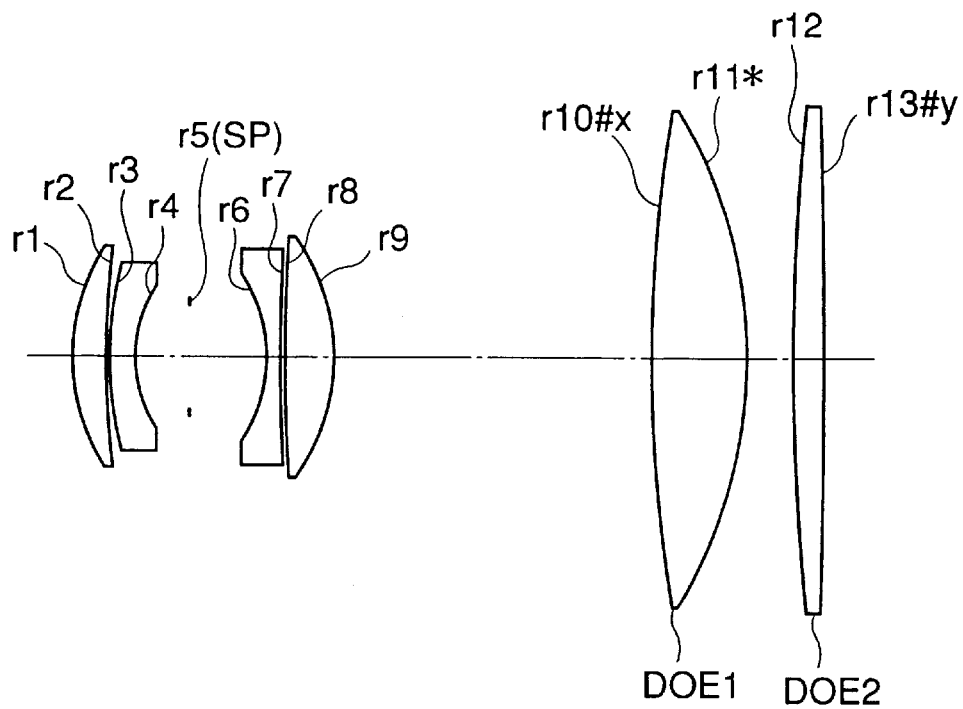
FIG. 7 is a lens arrangement diagram of the lens system of a seventh embodiment (Example 7) of the present invention.
Figure 8:
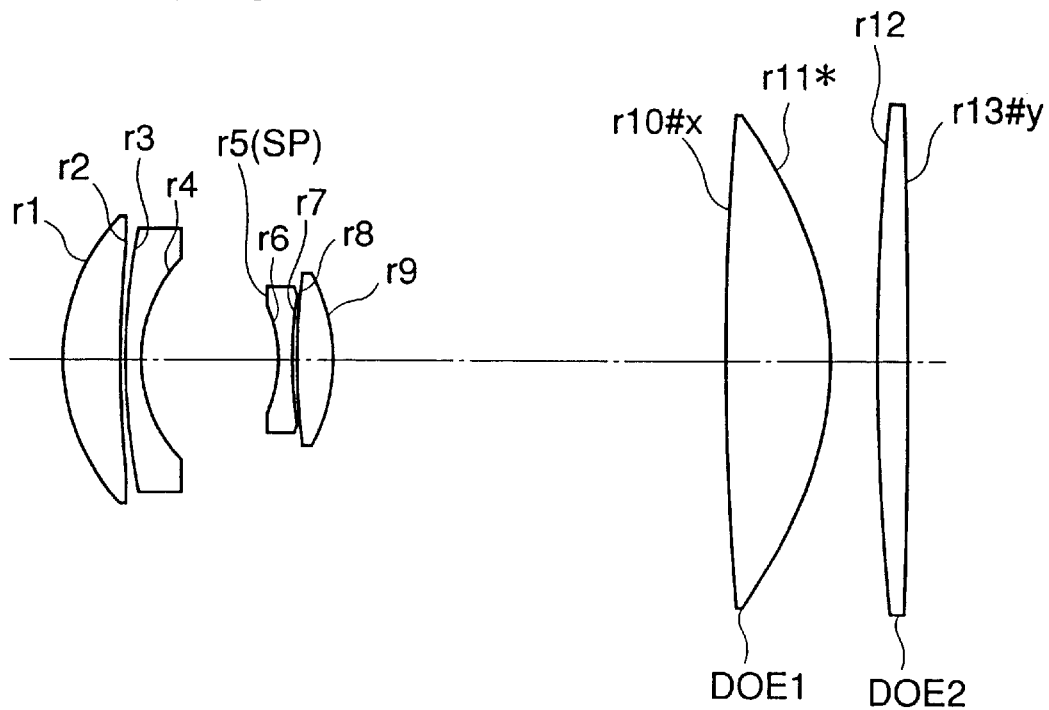
FIG. 8 is a lens arrangement diagram of the lens system of an eighth embodiment (Example 8) of the present invention.

Hereinafter, lens systems embodying the present invention will be described with reference to the drawings. FIGS. 1 to 8 are lens arrangement diagrams of the lens systems of a first, a second, a third, a fourth, a fifth, a sixth, a seventh, and an eighth embodiment, respectively. In these diagrams, $r_i$ (i=1, 2, 3, . . . ) represents the ith surface counted from the enlargement side (the original-image side). Moreover, a surface $r_i$ marked with an asterisk (*) is an aspherical surface, and a surface $r_i$ marked with # is a diffractive surface.

The lens systems of the first to eighth embodiments are all built as focusing lens systems used to read a color image by being placed between an original image to be copied and an image sensor for sensing the image. These lens systems have a positive lens element disposed at the image-sensor-side end (the reduction side) thereof. This positive lens element is provided with at least one diffractive surface having a positive optical power of diffraction so as to act as a diffractive optical element (DOE). A diffractive surface may exhibit, on its own, a negative dispersion as high as −3.45, which cannot be obtained by the use of a common lens material. In all of the embodiments, this high dispersion is exploited to correct chromatic aberration, in particular, in order to reduce the number of constituent lens elements and thereby make the entire lens system compact.

Moreover, in all of the embodiments, a positively-powered lens element is disposed at the image-sensor-side end of the lens system in order to place the exit pupil as far as possible in the direction of the enlargement side and thereby make the lens system substantially telecentric toward the reduction side (the image side). This arrangement conveniently allows light rays to be incident on the image sensor at substantially the same angle all over the imaging area, and thus makes it possible to realize a high-performance optical system that suffers little from color shading and lateral chromatic aberration. Accordingly, it is possible to obtain sufficiently high contrast even at the periphery of the image plane. This facilitates adjustment of a color image reading apparatus. Moreover, the diffractive optical element (DOE) has a positive optical power of diffraction, and therefore it exerts a positive optical power both in a refractive optical system and in a diffractive optical system. This helps achieve proper correction of aberrations. In addition, a positively-powered diffractive surface has the ability to correct the chromatic aberration occurring in an ordinary positive lens element and thus helps achieve proper correction of chromatic aberration.

As described above, in all of the embodiments, the ability of the diffractive optical element (DOE) to correct chromatic aberration is exploited effectively to realize a compact, low-cost, and high-performance lens system that corrects chromatic and other aberrations properly with as few as four to six lens elements in total. In addition, as the number of constituent lens elements is reduced, it is possible to obtain high optical performance sufficient for achieving satisfactorily high definition and proper color handling as required in color image reading. This makes it possible to realize a compact, low-cost, and high-performance color image reading apparatus. The conditions to be preferably fulfilled by the lens systems of the embodiments will be described below.

It is preferable that Condition (1) below be fulfilled:

$$-5 < P \times \phi < -1.2 \tag{1}$$

wherein

P represents the distance between the last lens surface in the lens system and the exit pupil (the distance is negative if it lies on the object-plane side of the last lens surface and positive if it lies on the image-plane side of the last lens surface); and $\phi$ represents the optical power of the entire lens system.

Condition (1) defines the condition as to the position of the exit pupil which is preferably fulfilled to make the lens system substantially telecentric toward the reduction (image) side. If the value of Condition (1) is greater than its upper limit, the exit pupil is placed so close to the image plane that it is impossible to make the lens system sufficiently telecentric. In contrast, if the value of Condition (1) is less than its lower limit, it is necessary to give a stronger optical power to the lens element disposed at the image-sensor-side end of the lens system. As a result, the lens element becomes unduly large and degrades optical performance in terms of, for example, spherical aberration.

It is preferable that Conditions (2) and (3) below be fulfilled:

$$0.2 < \phi d/\phi < 1 \tag{2}$$

$$0.3 < \phi f/\phi < 1.2 \tag{3}$$

wherein $\phi$ represents the optical power of the entire lens system;

$\phi d$ represents the optical power of the diffractive optical element (DOE); and $\phi f$ represents the composite optical power of the lens elements disposed on the original-image (enlargement) side of the diffractive optical element (DOE).

Condition (2) defines the condition which is preferably fulfilled as to the optical power of the diffractive optical element (DOE), i.e., the positive lens element disposed at the image-sensor-side end of the lens system. If the value of Condition (2) is greater than its upper limit, the optical power of this lens element is too strong, and thus spherical aberration and coma aberration become unduly large. Moreover, the lens element needs to made thicker at the center to obtain a greater curvature. This makes the lens element unduly large. It is possible to correct aberrations by increasing the diffractive power. This, however, requires the pitch of the diffractive surface be made unduly fine and thus makes the manufacture of the diffractive optical element (DOE) difficult. In contrast, if the value of Condition (2) is less than its lower limit, it is impossible to correct chromatic aberration properly or keep the lens system sufficiently telecentric.

Condition (3) defines the condition which is preferably fulfilled as to the optical power of the lens elements disposed on the enlargement side of the diffractive optical element (DOE). If the value of Condition (3) is greater than its upper limit, an unduly strict limitation is imposed on the optical power of the diffractive optical element (DOE), and thus it is difficult to make the lens system sufficiently telecentric. In contrast, if the value of Condition (3) is less than its lower limit, spherical aberration and coma aberration become unduly large and the lens system needs to be made unduly large.

It is preferable that the diffractive optical element (DOE) be made of resin and that Condition (4) below be fulfilled:

$$0.01 < \phi s/\phi d < 0.1 \tag{4}$$

wherein $\phi s$ represents the optical power resulting from the light-diffracting action of the diffractive optical element (DOE); and $\phi d$ represents the optical power of the diffractive optical element (DOE).

Forming a diffractive optical element (DOE) out of resin offers the following advantages. In order to make the lens system substantially telecentric toward the reduction (image) side, the lens system needs to have, at its image-sensor-side end, a lens element (a diffractive optical element) having substantially the same total length as that of the image sensor. Using a common glass lens element here leads to a considerable increase in manufacturing costs. Using a resin lens element here makes it possible to manufacture the diffractive surface by molding, and thus facilitate the production of the diffractive optical element. This helps reduce the costs and weight of the lens element and achieve proper correction of chromatic and other aberrations. This also makes it possible to reduce the size of the lens element by cutting off the upper and lower edges so as not to obstruct the effective optical path.

Condition (4) defines the condition which is preferably fulfilled as to the optical power resulting from the light-diffracting action of the diffractive optical element (DOE) and the optical power of the single lens element constituting the diffractive optical element (DOE). If the value of Condition (4) is greater than its upper limit, the optical power resulting from the light-diffracting action of the diffractive optical element (DOE) is so strong that chromatic aberration is overcorrected and simultaneously coma aberration and curvature of field become unduly large. Furthermore, the pitch of the diffractive optical surface needs to be so small that it is difficult to manufacture the diffractive optical element (DOE). In contrast, if the value of Condition (4) is less than its lower limit, chromatic aberration is undercorrected.

In the fourth embodiment, the diffractive optical element (DOE) has a diffractive surface formed on a flat surface. It is preferable to form a diffractive surface on a flat surface because doing so is easy from the viewpoint of manufacture. Moreover, in the first to sixth embodiments, the diffractive optical element (DOE) has a diffractive surface having a concentrically-formed grating. It is preferable to form a diffractive surface having a concentrically-formed grating because doing so is easy from the viewpoint of manufacture and advantageous from the viewpoint of aberration correction. Note that, where a one-dimensional sensor is employed as the image sensor, the diffractive optical element (DOE) does not necessarily have to have a diffractive surface having a concentrically-formed grating. It is also possible to use instead a diffractive surface having a grating formed in a hyperbolic, parabolic, or any other shape as required.

It is preferable that the diffractive optical element (DOE) be designed to exert a color-separating effect in a direction perpendicular to the longer sides of the image sensor. This makes it possible, where a three-plate line sensor or the like is used as the image sensor, to read out one line of the original image at a time and thereby achieve higher reading accuracy and higher reading speed.

In the seventh and eighth embodiments, the lens system has two positive lens elements disposed at the image-sensor-side end thereof. These two lens elements are each provided with a diffractive surface having a positive optical power of diffraction so as to act as diffractive optical elements (DOE1 and DOE2). By disposing a plurality of diffractive optical elements at the image-sensor-side end of the lens system in this way, it is possible to achieve proper correction of chromatic aberration. Moreover, it is also possible to place the exit pupil far away from the image plane and thereby make the lens system sufficiently telecentric. Furthermore, it is also possible to perform aberration correction and light deflection separately in the directions of the longer and shorter sides of the image sensor, and thereby obtain higher optical performance and higher color-separation accuracy.

In a lens system having a plurality of diffractive optical elements disposed at the image-sensor-side end thereof, it is preferable that Condition (5) below be fulfilled:

$$-10 < P \times \phi < -1 \qquad (5)$$

wherein

P represents the distance between the last lens surface in the lens system and the exit pupil (the distance is negative if it lies on the object-plane side of the last lens surface and positive if it lies on the image-plane side of the last lens surface); and 100 represents the optical power of the entire lens system.

Condition (5) defines the condition as to the position of the exit pupil which is preferably fulfilled to make the lens system substantially telecentric toward the reduction (image) side. If the value of Condition (5) is greater than its upper limit, the exit pupil is placed so close to the image plane that it is impossible to make the lens system sufficiently telecentric. In contrast, if the value of Condition (5) is less than its lower limit, the lens system suffers from unduly large size and unduly large spherical and other aberrations.

In a lens system having a plurality of diffractive optical elements disposed at the image-sensor-side end thereof, it is preferable that Condition (6) below be fulfilled:

$$0.4 < \phi d0/\phi < 1.2 \qquad (6)$$

wherein $\phi$ represents the optical power of the entire lens system; and $\phi d0$ represents the composite optical power of the diffractive optical elements (DOE1 and DOE2), in the direction of the longer sides of the image sensor.

Condition (6) defines the condition which is preferably fulfilled as to the optical power of the diffractive optical element in the direction of the longer sides of the image sensor. If the value of Condition (6) is greater than its upper limit, spherical and coma aberrations become unduly large, and it is difficult to manufacture the diffractive optical element. In contrast, if the value of Condition (6) is less than its lower limit, it is impossible to achieve proper correction of chromatic aberration, or to make the lens system sufficiently telecentric.

In a lens system having a plurality of diffractive optical elements disposed at the image-sensor-side end thereof, it is preferable that these diffractive optical elements be made of resin and that Condition (7) below be fulfilled:

$$0.007 < \phi s0/\phi d0 < 0.05 \qquad (7)$$

wherein $\phi s0$ represents the composite optical power of diffraction of all the diffractive optical elements (DOE1 and DOE2), in the direction of the longer sides of the image sensor; and $\phi d0$ represents the composite optical power of all the diffractive optical elements (DOE1 and DOE2), in the direction of the longer sides of the image sensor.

Condition (7) defines the condition which is preferably fulfilled as to the composite optical power of diffraction of the diffractive optical elements and the composite optical power of the lens elements constituting the diffractive optical elements, in the direction of the longer sides of the image sensor. If the value of Condition (7) is greater than its upper limit, the optical power resulting from the light-diffracting action of the diffractive optical element is too strong, and thus chromatic aberration is overcorrected, and coma aberration and curvature of field become unduly large. Furthermore, the pitch of the diffractive surface needs to be so small that it is difficult to manufacture the diffractive optical element. In contrast, if the value of Condition (7) is less than its lower limit, chromatic aberration is undercorrected. Note that forming a diffractive optical element out of resin offers the advantages as described above.

In the seventh and eighth embodiments, the diffractive optical element (DOE2) disposed at the image-side end has a diffractive surface formed on a flat surface. As described above, it is preferable to form a diffractive surface on a flat surface because doing so is easy from the viewpoint of manufacture. Moreover, in the seventh and eighth embodiments, the diffractive optical elements (DOE1 and DOE2) each have a diffractive surface having a linearly-formed grating. Forming a diffractive surface having a linearly-formed grating is preferable because doing so is also easy from the viewpoint of manufacture. In addition, using of a plurality of diffractive optical elements in combination, it is possible to perform aberration correction and light deflection separately in the directions of the longer and shorter sides of the image sensor. In other words, it is possible to use one diffractive optical element to correct aberrations and make the lens system sufficiently telecentric, and another to perform color separation.

Moreover, in a lens system having a plurality of diffractive optical elements disposed at the image-sensor-side end thereof, it is preferable that the diffractive optical element be designed to exert a color-separating effect in a direction perpendicular to the longer sides of the image sensor. As described above, this makes it possible, where a three-plate line sensor or the like is used as the image sensor, to read out one line on the original image at a time and thereby achieve higher reading accuracy and higher reading speed. In addition, by disposing a diffractive optical element that exerts the color-separating effect described above at the image-sensor-side end of the lens system, it is possible to obtain higher color separation accuracy.

EXAMPLES

Hereinafter, examples of lens systems embodying the present invention will be presented with reference to their construction data, graphic representations of aberrations, and other data. Tables 1 to 8 list the construction data of Examples 1 to 8, which respectively correspond to the first to eighth embodiments described above and have lens arrangements as shown in FIGS. 1 to 8.

In the construction data of each example, ri (i=1, 2, 3, . . . ) represents the radius of curvature of the ith surface counted from the enlargement side, di (i=1, 2, 3, . . . ) represents the ith axial distance counted from the enlargement side, and Ni (i=1, 2, 3, . . . ) and vi (i=1, 2, 3, . . . ) respectively represent the refractive index (Nd) for the d line and the Abbe number (vd) of the ith lens element counted from the enlargement side. Also listed are the focal length f and the F-number Fno of the entire zoom lens system and the magnification at which it is assumed to be set. Moreover, Table 9 lists the values corresponding to conditions (1) to (7) as observed in each example.

A surface whose radius of curvature ri is marked with an asterisk (*) is an aspherical surface, whose surface shape is defined by Formula (AS) below. A surface whose radius of curvature ri is marked with # is a concentrically-formed diffractive surface, wherein the phase shape of the pitch is defined by Formula (DS) below. Moreover, a surface whose radius of curvature ri is marked with #x is a linearly-formed diffractive surface which is perpendicular to the direction (the X direction) of the shorter-sides of the image sensor. A surface whose radius of curvature ri is marked with #y is a linearly-formed diffractive surface which is perpendicular to the direction (the Y direction) of the longer-sides of the image sensor. The phase shape of the pitch is defined by Formulae (DSx and DSy) below for surfaces marked #x and #y, respectively. Also listed together are the aspherical surface data of each aspherical surface, the diffractive surface data of each diffractive surface, and other data.

Formula (AS) provides that:

$$Z=(C \cdot H^2)/(1+\sqrt{1-\epsilon \cdot C^2 \cdot H^2})+(A1 \cdot H^4+A2 \cdot H^6+A3 \cdot H^8+A4 \cdot H^{10}) \quad (AS)$$

wherein
Z represents the displacement from the reference surface along the optical axis at a height H (for rectangular coordinates X, Y, and Z, $H^2=X^2+y^2$ holds);

H represents the height in a direction perpendicular to the optical axis;

C represents the paraxial curvature;

$\epsilon$ represents the quadric surface parameter (note that, in all examples presented below, $\epsilon=1$);

A1 represents the aspherical coefficient of the fourth order;

A2 represents the aspherical coefficient of the sixth order;

A3 represents the aspherical coefficient of the eighth order; and

A4 represents the aspherical coefficient of the tenth order.

Formula (DS) provides that:

$$F(H)=(2\pi/\lambda 0) \cdot (B1 \cdot H^2+B2 \cdot H^4+B3 \cdot H^6) \quad (DS)$$

wherein
F(H) represents the phase function of the diffractive surface;

H represents the height in a direction perpendicular to the optical axis;

B1 represents the phase function coefficient of the second order;

B2 represents the phase function coefficient of the fourth order;

B3 represents the phase function coefficient of the sixth order; and $\lambda 0$ represents the design center wavelength (=587.56 nm, i.e. the wavelength of the d line).

Formula (DSx) provides that:

$$F(x)=(2\pi/\lambda 0) \cdot (Bx1 \cdot x^2+Bx2 \cdot x^4+Bx3 \cdot x^6) \quad (DSx)$$

wherein
F(x) represents the phase function of the diffractive surface;

x represents the distance in the direction (the X direction) of the shorter sides of the image sensor with respect to the optical axis;

Bx1 represents the phase function coefficient of the second order;

Bx2 represents the phase function coefficient of the fourth order;

Bx3 represents the phase function coefficient of the sixth order; and $\lambda 0$ represents the design center wavelength (=587.56 nm, i.e. the wavelength of the d line).

Formula (DSy) provides that:

$$F(y)=(2\pi/\lambda 0) \cdot (By1 \cdot y^2+By2 \cdot y^4+By3 \cdot y^6) \quad (DSy)$$

wherein
F(y) represents the phase function of the diffractive surface;

y represents the distance in the direction (the Y direction) of the longer sides of the image sensor with respect to the optical axis;

By1 represents the phase function coefficient of the second order;

By2 represents the phase function coefficient of the fourth order;

By3 represents the phase function coefficient of the sixth order; and $\lambda 0$ represents the design center wavelength (=587.56 nm, i.e. the wavelength of the d line).

Figure 9A:
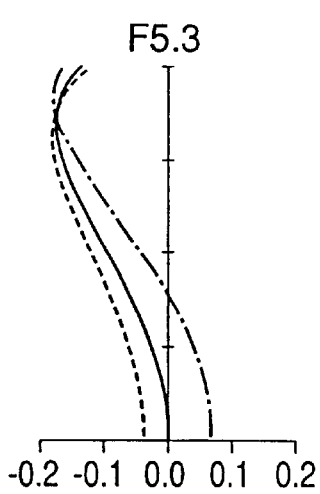
FIGS. 9A to 9C are graphic representations of the aberrations observed in the lens system of Example 1.
Figure 9B:
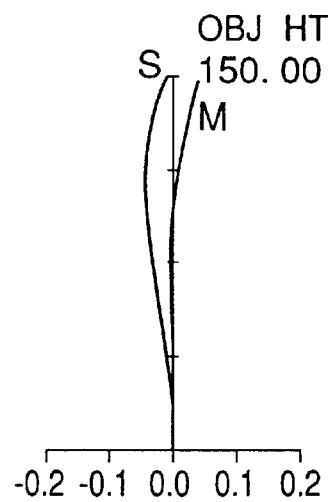
Figure 9C:
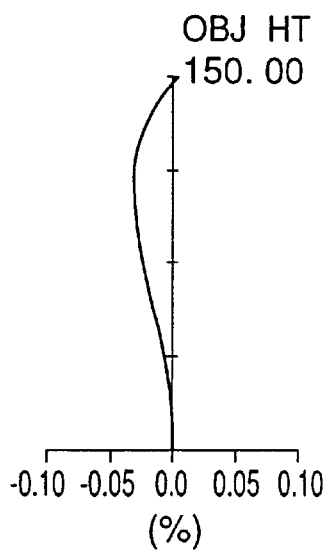
Figure 10A:
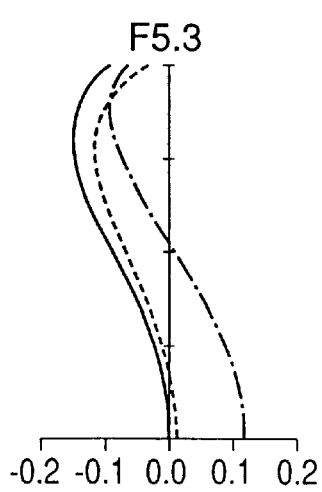
FIGS. 10A to 10C are graphic representations of the aberrations observed in the lens system of Example 2.
Figure 10B:
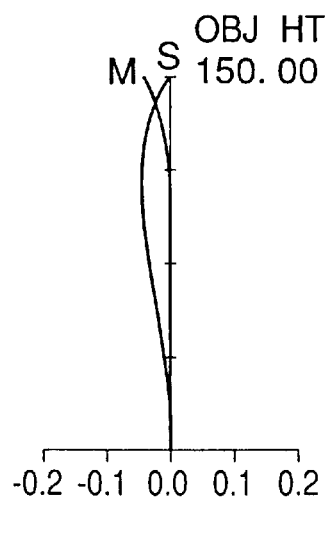
Figure 10C:
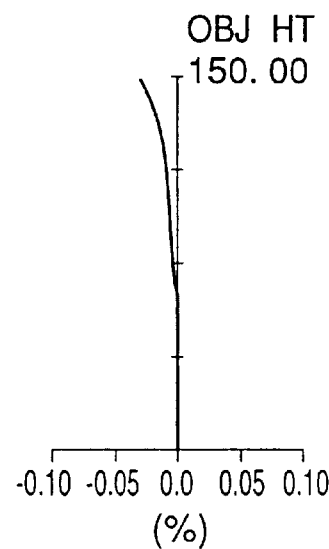
Figure 11A:
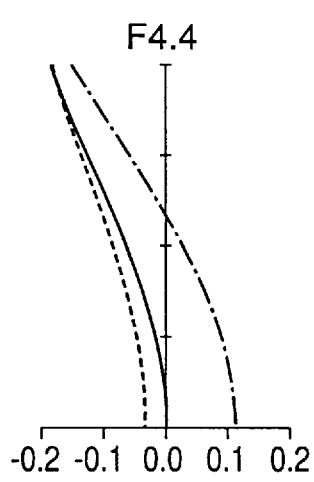
FIGS. 11A to 11C are graphic representations of the aberrations observed in the lens system of Example 3.
Figure 11B:
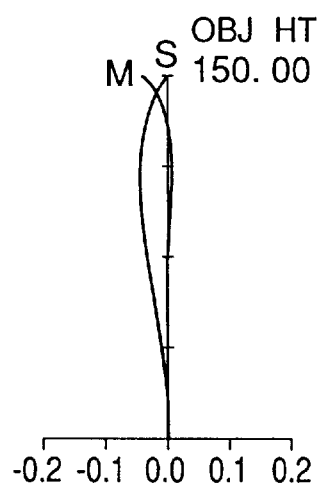
Figure 11C:
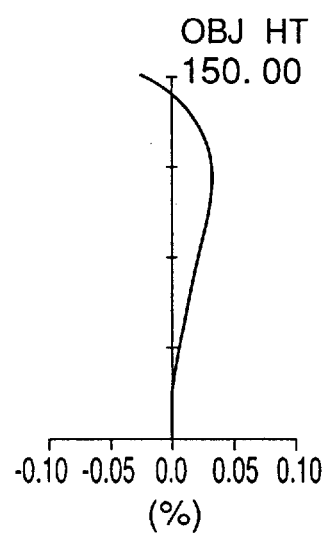
Figure 12A:
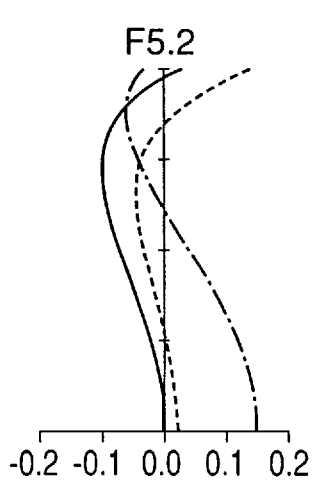
FIGS. 12A to 12C are graphic representations of the aberrations observed in the lens system of Example 4.
Figure 12B:
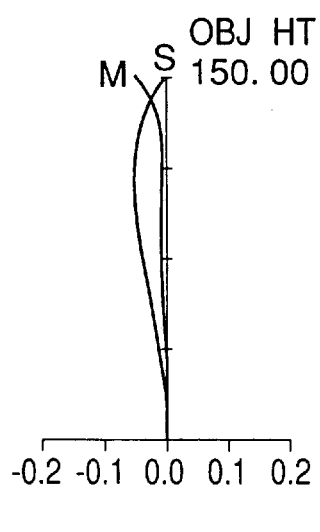
Figure 12C:
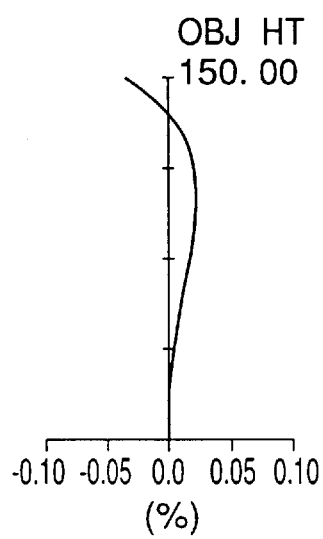
Figure 13A:
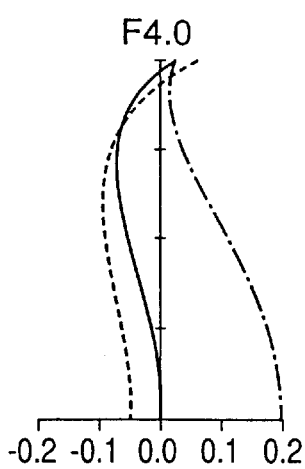
FIGS. 13A to 13C are graphic representations of the aberrations observed in the lens system of Example 5.
Figure 13B:
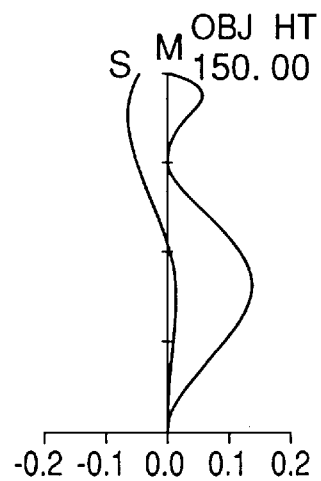
Figure 13C:
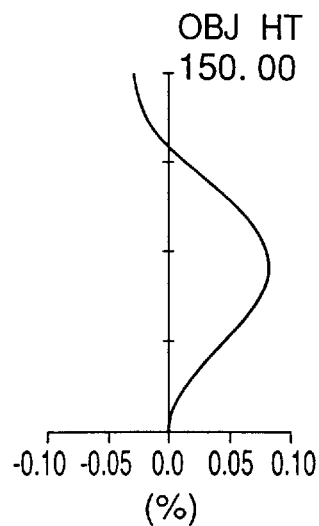
Figure 14A:
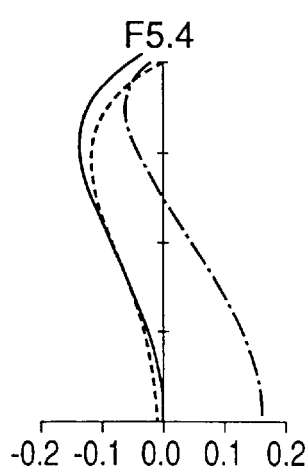
FIGS. 14A to 14C are graphic representations of the aberrations observed in the lens system of Example 6.
Figure 14B:
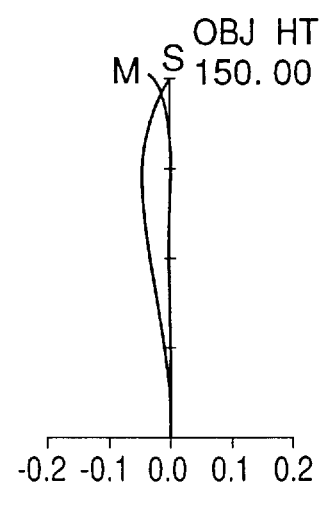
Figure 14C:
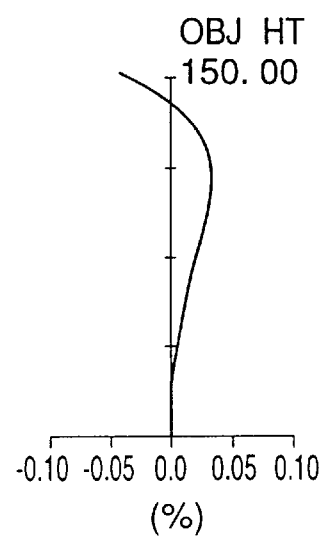
Figure 15A:
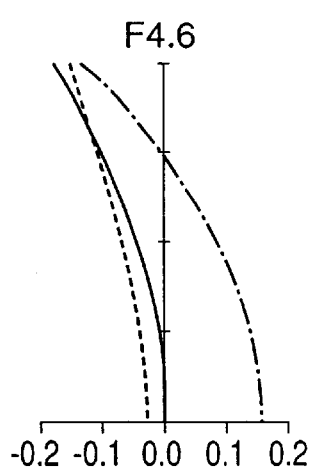
FIGS. 15A to 15C are graphic representations of the aberrations observed in the lens system of Example 7.
Figure 15B:
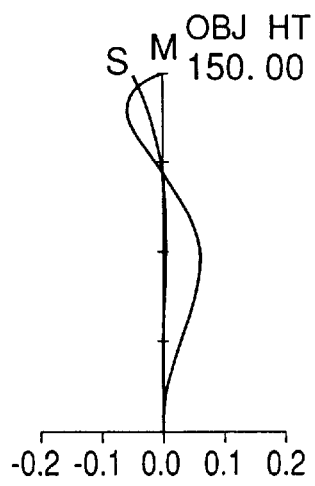
Figure 15C:
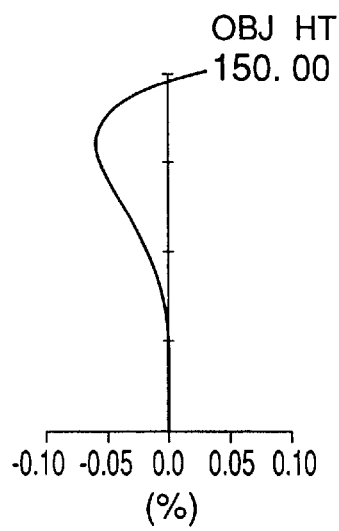
Figure 16A:
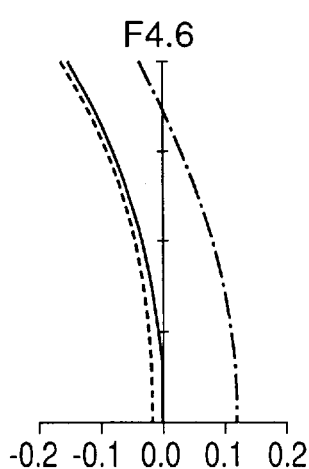
FIGS. 16A to 16C are graphic representations of the aberrations observed in the lens system of Example 8.
Figure 16B:
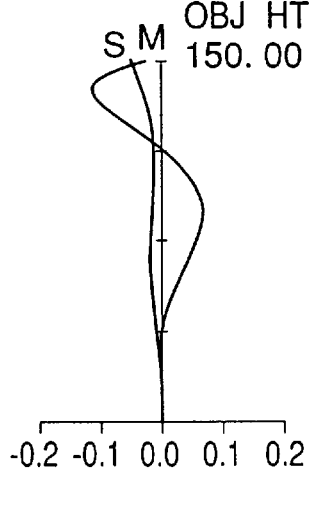
Figure 16C:
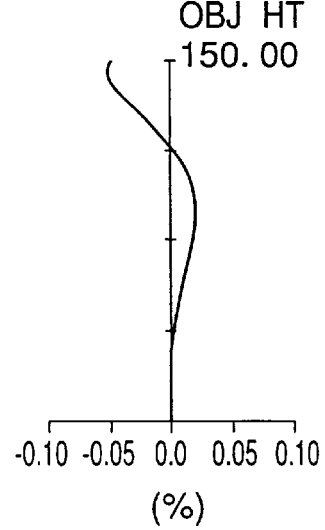

FIGS. 9A to 9C, 10A to 10C, 11A to 11C, 12A to 12C, 13A to 13C, 14A to 14C 15A to 15C, and 16A to 16C are graphic representations of the aberrations observed in the lens systems of Examples 1 to 8, respectively. Of these diagrams, FIGS. 9A, 10A, 11A, 12A, 13A, 14A, 15A, and 16A show spherical aberration; FIGS. 9B, 10B, 11B, 12B, 13B, 14B, 15B, and 16B show astigmatism; and FIGS. 9C, 10C, 11C, 12C, 13C, 14C, 15C and 16C show distortion. In the spherical aberration diagrams, the broken line represents the aberration for the C line (wavelength $\lambda C$: 656.3 nm), the solid line represents the aberration for the d line (wavelength $\lambda d$: 587.6 nm), and the dash-and-dot line represents the aberration for the F line (wavelength $\lambda F$: 486.1 nm). For spherical aberration (taken along the horizontal axis and given as the deviation (mm) from the paraxial image plane along the optical axis), the F number is taken along the vertical axis. For astigmatism (taken along the horizontal axis and given as the deviation (mm) from the paraxial image plane along the optical axis) and distortion (taken along the horizontal axis and given in %), the object height (OBJ HT (mm)) is taken along the vertical axis. In the astigmatism diagrams, the solid line M represents the astigmatism for meridional rays, and the solid line S represents the astigmatism for sagittal rays.

TABLE 1

Construction Data of Example 1 f = 65.1(mm), Fno = 5.3, Magnification = 0.158×

| Radius of Curvature | Axial Distance | Refractive Index | Abbe Number |
|---|---|---|---|
| r1 = 19.676 | | | |
| | d1 = 3.423 | Ni = 1.8050 | v1 = 46.5 |
| r2 = 42.655 | | | |
| | d2 = 0.500 | | |
| r3 = 16.982 | | | |
| | d3 = 5.175 | N2 = 1.8450 | v2 = 23.5 |
| r4 = 8.668 | | | |
| | d4 = 7.411 | | |
| r5 = ∞{Aperture Stop (SP)} | | | |
| | d5 = 7.302 | | |
| r6 = −16.934 | | | |
| | d6 = 4.225 | N3 = 1.5180 | v3 = 69.4 |
| r7 = −12.300 | | | |
| | d7 = 29.726 | | |
| r8# = 171.309 | | | |
| | d8 = 5.417 | N4 = 1.4930 | v4 = 58.0 |
| r9 = −66.087 | | | |

Diffractive Surface Data of Eighth Surface (r8)

B1 = −4.1583 × 10$^{-4}$
B2 = 3.6496 × 10$^{-7}$
B3 = −5.6957 × 10$^{-11}$

TABLE 2

Construction Data of Example 2 f = 64.7(mm), Fno = 5.3, Magnification = −0.158×

| Radius of Curvature | Axial Distance | Refractive Index | Abbe Number |
|---|---|---|---|
| r1 = 16.698 | | | |
| | d1 = 2.894 | Ni = 1.8050 | v1 = 46.5 |
| r2 = 39.751 | | | |
| | d2 = 0.500 | | |
| r3 = 20.138 | | | |
| | d3 = 3.395 | N2 = 1.8450 | v2 = 23.5 |

TABLE 2-continued

Construction Data of Example 2

| | | | |
|---|---|---|---|
| r4 = 11.765 | | | |
| | d4 = 1.937 | | |
| r5 = ∞{Aperture Stop (SP)} | | | |
| | d5 = 10.911 | | |
| r6 = −9.207 | | | |
| | d6 = 2.257 | N3 = 1.8450 | v3 = 23.5 |
| r7 = −12.712 | | | |
| | d7 = 0.500 | | |
| r8 = −27.682 | | | |
| | d8 = 4.210 | N4 = 1.6258 | v4 = 56.1 |
| r9 = −15.518 | | | |
| | d9 = 29.796 | | |
| r10# = 205.690 | | | |
| | d10 = 4.450 | N5 = 1.4930 | v5 = 58.0 |
| r11 = −108.273 | | | |

Diffractive Surface Data of Tenth Surface (r10)

B1 = −1.5898 × 10$^{-4}$
B2 = 1.0966 × 10$^{-7}$
B3 = −1.0905 × 10$^{-10}$

TABLE 3

Construction Data of Example 3 f = 64.1(mm), Fno = 4.0, Magnification = −0.158×

| Radius of Curvature | Axial Distance | Refractive Index | Abbe Number |
|---|---|---|---|
| r1 = 19.851 | | | |
| | d1 = 3.362 | N1 = 1.8050 | v1 = 46.5 |
| r2 = 72.484 | | | |
| | d2 = 0.500 | | |
| r3 = 17.876 | | | |
| | d3 = 1.792 | N2 = 1.8061 | v2 = 24.4 |
| r4 = 12.209 | | | |
| | d4 = 1.939 | | |
| r5 = ∞{Aperture Stop (SP)} | | | |
| | d5 = 0.500 | | |
| r6 = −1248.267 | | | |
| | d6 = 1.500 | N3 = 1.5160 | v3 = 52.3 |
| r7 = 47.251 | | | |
| | d7 = 10.584 | | |
| r8 = −11.311 | | | |
| | d8 = 1.510 | N4 = 1.8450 | v4 = 23.5 |
| r9 = −16.753 | | | |
| | d9 = 0.500 | | |
| r10 = −36.719 | | | |
| | d10 = 5.313 | N5 = 1.8050 | v5 = 46.5 |
| r11 = −18.449 | | | |
| | d11 = 27.804 | | |
| r12 = 200.000 | | | |
| | d12 = 5.558 | N6 = 1.4930 | v6 = 58.0 |
| r13 = −80.000 | | | |

Aspherical Surface Data of Thirteenth Surface (r13)

A1 = 0.12372 × 10$^{-5}$
A2 = −0.30729 × 10$^{-8}$
A3 = 0.96221 × 10$^{-11}$
A4 = 0.87518 × 10$^{-14}$

Diffractive Surface Data of Twelfth Surface (r12)

B1 = −2.4210 × 10$^{-4}$
B2 = 2.6935 × 10$^{-7}$
B3 = −4.9351 × 10$^{-10}$

TABLE 4

Construction Data of Example 4 f = 65.4(mm), Fno = 5.4, Magnification = -0.158×

| Radius of Curvature | Axial Distance | Refractive Index | Abbe Number |
|---|---|---|---|
| r1 = 17.358 | | | |
| | d1 = 2.764 | N1 = 1.7883 | ν1 = 47.3 |
| r2 = 47.026 | | | |
| | d2 = 1.059 | | |
| r3 = 16.596 | | | |
| | d3 = 2.610 | N2 = 1.8098 | ν2 = 24.3 |
| r4 = 11.097 | | | |
| | d4 = 1.160 | | |
| r5 = ∞{Aperture Stop (SP)} | | | |
| | d5 = 6.414 | | |
| r6 = 58.025 | | | |
| | d6 = 1.500 | N3 = 1.8052 | ν3 = 25.4 |
| r7 = 31.150 | | | |
| | d7 = 5.318 | | |
| r8 = -8.302 | | | |
| | d8 = 1.500 | N4 = 1.8467 | ν4 = 23.8 |
| r9 = -10.745 | | | |
| | d9 = 0.500 | | |
| r10 = -22.676 | | | |
| | d10 = 4.674 | N5 = 1.5654 | ν5 = 62.2 |
| r11 = -14.228 | | | |
| | d11 = 21.061 | | |
| r12# = ∞ | | | |
| | d12 = 7.839 | N6 = 1.4930 | ν6 = 58.0 |
| r13 = -39.851 | | | |

Diffractive Surface Data of Twelfth Surface (r12)

B1 = -1.1680 × 10$^{-4}$
B2 = 1.6907 × 10$^{-7}$
B3 = -3.0881 × 10$^{-10}$

TABLE 5

Construction Data of Example 5 f = 45.2(mm), Fno = 4.4, Magnification = -0.100 ×

| Radius of Curvature | Axial Distance | Refractive Index | Abbe Number |
|---|---|---|---|
| r1 = 16.639 | | | |
| | d1 = 3.192 | N1 = 1.8223 | ν1 = 32.4 |
| r2 = 72.466 | | | |
| | d2 = 4.023 | | |
| r3 = 42.943 | | | |
| | d3 = 1.500 | N2 = 1.8450 | ν2 = 23.5 |
| r4 = 9.467 | | | |
| | d4 = 0.829 | | |
| r5 = ∞{Aperture Stop (SP)} | | | |
| | d5 = 0.500 | | |
| r6 = 12.535 | | | |
| | d6 = 6.265 | N3 = 1.5806 | ν3 = 60.4 |
| r7 = 18.249 | | | |
| | d7 = 4.516 | | |
| r8 = -8.161 | | | |
| | d8 = 1.764 | N4 = 1.8450 | ν4 = 23.5 |
| r9 = -11.445 | | | |
| | d9 = 0.500 | | |
| r10 = -21.586 | | | |
| | d10 = 3.912 | N5 = 1.8050 | ν5 = 46.5 |
| r11 = -13.188 | | | |
| | d11 = 12.219 | | |
| r12 = 122.174 | | | |
| | d12 = 6.677 | N6 = 1.4930 | ν6 = 58.0 |
| r13# = -32.227 | | | |

TABLE 5-continued

Construction Data of Example 5

Diffractive Surface Data of Thirteenth Surface (r13)

B1 = -3.6975 × 10$^{-4}$
B2 = 5.1018 × 10$^{-7}$
B3 = -1.1874 × 10$^{-9}$

TABLE 6

Construction Data of Example 6 f = 78.3(mm), Fno = 5.2, Magnification = -0.200×

| Radius of Curvature | Axial Distance | Refractive Index | Abbe Number |
|---|---|---|---|
| r1 = 16.645 | | | |
| | d1 = 3.966 | N1 = 1.7924 | ν1 = 46.9 |
| r2 = 40.043 | | | |
| | d2 = 0.500 | | |
| r3 = 18.000 | | | |
| | d3 = 1.500 | N2 = 1.7436 | ν2 = 26.4 |
| r4 = 11.651 | | | |
| | d4 = 4.890 | | |
| r5 = ∞{Aperture Stop (SP)} | | | |
| | d5 = 4.572 | | |
| r6 = -82.085 | | | |
| | d6 = 1.500 | N3 = 1.5161 | ν3 = 53.1 |
| r7 = 4605.435 | | | |
| | d7 = 3.819 | | |
| r8 = -10.450 | | | |
| | d8 = 1.500 | N4 = 1.8069 | ν4 = 24.4 |
| r9 = -15.522 | | | |
| | d9 = 0.716 | | |
| r10 = -30.622 | | | |
| | d10 = 4.038 | N5 = 1.8050 | ν5 = 46.5 |
| r11 = -17.265 | | | |
| | d11 = 44.600 | | |
| r12 = 108.283 | | | |
| | d12 = 7.382 | N6 = 1.4930 | ν6 = 58.0 |
| r13# = -170.618 | | | |

Diffractive Surface Data of Thirteenth Surface (r13)

B1 = -1.3854 × 10$^{-4}$
B2 = 1.5109 × 10$^{-7}$
B3 = -8.6449 × 10$^{-11}$

TABLE 7

Construction Data of Example 7 f = 63.7(mm), Fno = 4.6, Magnification = -0.158×

| Radius of Curvature | Axial Distance | Refractive Index | Abbe Number |
|---|---|---|---|
| r1 = 22.608 | | | |
| | d1 = 3.683 | N1 = 1.8226 | ν1 = 32.2 |
| r2 = 105.170 | | | |
| | d2 = 0.500 | | |
| r3 = 46.902 | | | |
| | d3 = 2.430 | N2 = 1.6384 | ν2 = 31.7 |
| r4 = 14.800 | | | |
| | d4 = 5.797 | | |
| r5 = ∞{Aperture Stop (SP)} | | | |
| | d5 = 7.830 | | |
| r6 = -15.905 | | | |
| | d6 = 1.500 | N3 = 1.7122 | ν3 = 27.6 |
| r7 = 354.686 | | | |
| | d7 = 0.500 | | |
| r8 = 229.133 | | | |
| | d8 = 5.260 | N4 = 1.7916 | ν4 = 47.0 |

TABLE 7-continued

Construction Data of Example 7 r9 = −21.738
    d9 = 33.245
r10#x = 175.770
    d10 = 9.880    N5 = 1.4930    ν5 = 58.0
r11 * = −45.391
    d11 = 5.000
r12 = 259.737
    d12 = 3.000    N6 = 1.4930    ν6 = 58.0
r13#y = ∞

Aspherical Surface Data of Eleventh Surface (r11)

$A1 = 0.22357 \times 10^{-5}$
$A2 = 0.43830 \times 10^{-9}$
$A3 = 0.16834 \times 10^{-12}$
$A4 = 0.13722 \times 10^{-15}$ Diffractive Surface Data of Tenth Surface (r10)

$Bx1 = -9.3339 \times 10^{-5}$
$Bx2 = 1.9085 \times 10^{-7}$
$Bx3 = 4.3747 \times 10^{-9}$ Diffractive Surface Data of Thirteenth Surface (r13)

$By1 = -1.2708 \times 10^{-4}$
$By2 = -1.0878 \times 10^{-7}$
$By3 = 1.0185 \times 10^{-13}$

TABLE 8

Construction Data of Example 8 f = 64.5(mm), Fno = 4.6, Magnification = −0.158x

| Radius of Curvature | Axial Distance | Refractive Index | Abbe Number |
|---|---|---|---|
| r1 = 22.477 | | | |
| | d1 = 5.776 | N1 = 1.8262 | ν1 = 30.4 |
| r2 = 110.141 | | | |
| | d2 = 0.500 | | |
| r3 = 82.354 | | | |
| | d3 = 1.500 | N2 = 1.5783 | ν2 = 37.5 |
| r4 = 14.645 | | | |
| | d4 = 13.049 | | |
| r5 = ∞{Aperture Stop (SP)} | | | |
| | d5 = 1.066 | | |
| r6 = −17.129 | | | |
| | d6 = 1.500 | N3 = 1.7344 | ν3 = 26.7 |
| r7 = 53.388 | | | |
| d7 = 0.500 | | | |
| r8 = 67.341 | | | |
| | d8 = 3.608 | N4 = 1.8050 | ν4 = 46.5 |
| r9 = −20.470 | | | |
| | d9 = 40.682 | | |
| r10#x = 520.182 | | | |
| | d10 = 10.763 | N5 = 1.4930 | ν5 = 58.0 |
| r11* = −36.197 | | | |
| | d11 = 5.000 | | |
| r12 = 255.062 | | | |
| | d12 = 3.000 | N6 = 1.4930 | ν6 = 58.0 |
| r13#y = ∞ | | | |

Aspherical Surface Data of Eleventh Surface (r11)

$A1 = 0.25947 \times 10^{-5}$
$A2 = 0.14213 \times 10^{-8}$
$A3 = -0.11563 \times 10^{-11}$
$A4 = 0.19036 \times 10^{-14}$ Diffractive Surface Data of Tenth Surface (r10)

$Bx1 = -7.5651 \times 10^{-5}$
$Bx2 = 3.3859 \times 10^{-7}$
$Bx3 = -5.8814 \times 10^{-9}$ Diffractive Surface Data of Thirteenth Surface (r13)

$By1 = -9.9640 \times 10^{-5}$
$By2 = -6.9626 \times 10^{-8}$
$By3 = 1.1486 \times 10^{-13}$

TABLE 9

Values Corresponding to Conditions (1) to (7)

| Example | (1) P × φ | (2) φd/φ | (3) φf/φ | (4) φs/φd | (5) P × φ | (6) φd0/φ | (7) φs0/φd0 |
|---|---|---|---|---|---|---|---|
| 1 | −1.46 | 0.721 | 0.657 | 0.0751 | — | — | — |
| 2 | −1.48 | 0.468 | 0.849 | 0.0440 | — | — | — |
| 3 | −1.83 | 0.580 | 0.719 | 0.0535 | — | — | — |
| 4 | −2.21 | 0.823 | 0.625 | 0.0186 | — | — | — |
| 5 | −3.12 | 0.894 | 0.894 | 0.0374 | — | — | — |
| 6 | −1.73 | 0.599 | 0.599 | 0.0362 | — | — | — |
| 7 | — | — | — | — | −5.12 | 0.983 | 0.0121 |
| 8 | — | — | — | — | −7.00 | 1.059 | 0.00921 |

What is claimed is:

1. An optical system for focusing an original image on an image sensor, comprising:

an optical element provided at an image-sensor-side end of the optical system, the optical element having a positive optical power as a whole, wherein at least one surface of the optical element has a positive optical power of diffraction, wherein the following condition is fulfilled:

$$-5 < P \times \Phi < -1.2$$

wherein

P represents a distance between a last lens surface in the optical system which is closest to the image sensor and an exit pupil, the distance being negative if lying on an object-plane side of the last lens surface and positive if lying on an image-plane side of the last lens surface; and Φ represents an optical power of the entire optical system.

2. An optical system for focusing an original image on an image sensor, comprising:

an optical element provided at an image-sensor-side end of the optical system, the optical element having a positive optical power as a whole, wherein at least one surface of the optical element has a positive optical power of diffraction, wherein the following conditions are fulfilled:

$$0.2 < \Phi d/\Phi < 1$$

$$0.3 < \Phi f/\Phi < 1.2$$

wherein

Φ represents an optical power of the entire optical system;

Φd represents an optical power of the optical element; and

Φf represents a composite optical power of all optical elements disposed on an original-image side of the optical element.

3. An optical system for focusing an original image on an image sensor, comprising:

an optical element provided at an image-sensor-side end of the optical system, the optical element having a positive optical power as a whole, wherein at least one surface of the optical element has a positive optical power of diffraction, wherein the optical element is made of resin and wherein the following condition is fulfilled:

$$0.01 < \Phi s/\Phi d < 0.1$$

wherein $\Phi s$ represents an optical power resulting from a light-diffracting action of the optical element; and $\Phi d$ represents an optical power of the optical element.

4. An optical system as claimed in claim 3, wherein the optical element has a diffractive surface formed on a flat surface.

5. An optical system for focusing an original image on an image sensor, comprising:

an optical element provided at an image-sensor-side end of the optical system, the optical element having a positive optical power as a whole, wherein at least one surface of the optical element has a positive optical power of diffraction, wherein the optical element exhibits a color-separating effect in a direction which is generally perpendicular to longer sides of the image sensor.

6. An optical system for focusing an original image on an image sensor, comprising:

a first optical element provided at an image-sensor-side end of the optical system, the first optical element having a positive optical power as a whole, wherein at least one surface of the first optical element has a positive optical power of diffraction; and a second optical element provided on an original-image side of the first optical element, the second optical element having a positive optical power as a whole, wherein at least one surface of the second optical element has a positive optical power of diffraction.

7. An optical system as claimed in claim 6, wherein the following condition is fulfilled:

$$-10 < P \times \Phi < -1$$

wherein

P represents a distance between a last lens surface in the optical system which is closest to the image sensor and an exit pupil, the distance being negative if lying on an object-plane side of the last lens surface and positive if lying on an image-plane side of the last lens surface; and $\Phi$ represents an optical power of the entire optical system.

8. An optical system as claimed in claim 6, wherein the following condition is fulfilled:

$$0.4 < \Phi d0/\Phi < 1.2$$

wherein $\Phi$ represents an optical power of the entire optical system; and $\Phi d0$ represents a composite optical power of all the optical elements having a positive optical power of diffraction, in a direction of longer sides of the image sensor.

9. An optical system as claimed in claim 6, wherein the optical elements are made of resin and wherein the following condition is fulfilled:

$$0.007 < \Phi s0/\Phi d0 < 0.05$$

wherein $\Phi s0$ represents a composite optical power resulting from a light-diffracting action of all the optical elements having a positive optical power of diffraction, in a direction which is generally parallel to longer sides of the image sensor; and $\Phi d0$ represents a composite optical power of all the optical elements having a positive optical power of diffraction, in the direction which is generally parallel to longer sides of the image sensor.

10. An optical system as claimed in claim 9, wherein at least one of the optical elements has a diffractive surface formed on a flat surface.

11. An optical system as claimed in claim 6, wherein at least one of the optical elements has a diffractive surface having a linearly-formed grating.

12. An optical system as claimed in claim 6, wherein the optical elements exhibit a color-separating effect in a direction perpendicular to longer sides of the image sensor.

13. An optical system as claimed in claim 12, wherein the optical elements that exhibit the color-separating effect are disposed at the image-sensor-side end of the optical system.

\* \* \* \* \*